(12) United States Patent
Chiba

(10) Patent No.: US 6,643,427 B2
(45) Date of Patent: Nov. 4, 2003

(54) WAVEGUIDE-ARRAYED OPTICAL WAVELENGTH MULTIPLEXER/ DEMULTIPLEXER AND FABRICATION METHOD OF THE SAME

(75) Inventor: Takafumi Chiba, Ibaraki (JP)

(73) Assignee: Hitachi Cable, Ltd., Tokyo (JP)

( * ) Notice: Subject to any disclaimer, the term of this patent is extended or adjusted under 35 U.S.C. 154(b) by 8 days.

(21) Appl. No.: 09/934,670

(22) Filed: Aug. 23, 2001

(65) Prior Publication Data

US 2002/0064339 A1 May 30, 2002

(30) Foreign Application Priority Data

Aug. 23, 2000 (JP) .......................................... 2000-251870

(51) Int. Cl.[7] .............................. G02B 6/28; G02B 6/34; G02B 6/26; G02B 6/42
(52) U.S. Cl. ............................. 385/24; 385/37; 385/46
(58) Field of Search ............................... 385/24, 37, 46

(56) References Cited

U.S. PATENT DOCUMENTS

| | | | | |
|---|---|---|---|---|
| 5,745,618 A | * | 4/1998 | Li ................................. | 385/46 |
| 5,751,872 A | * | 5/1998 | Bissessur et al. ............. | 385/37 |
| 6,058,233 A | * | 5/2000 | Dragone ....................... | 385/46 |
| 6,195,482 B1 | * | 2/2001 | Dragone ....................... | 385/28 |
| 6,289,699 B1 | * | 9/2001 | Kewitsch et al. ............. | 65/406 |
| 6,434,303 B1 | * | 8/2002 | Temkin et al. ................ | 385/43 |
| 6,466,715 B1 | * | 10/2002 | Akiba et al. ................... | 385/37 |
| 6,493,487 B1 | * | 12/2002 | Temkin et al. ................ | 385/37 |

FOREIGN PATENT DOCUMENTS

| | | |
|---|---|---|
| EP | 0 822 428 | 2/1998 |
| GB | 2 349 957 | 11/2000 |

* cited by examiner

*Primary Examiner*—John D. Lee
*Assistant Examiner*—Tina M Lin
(74) *Attorney, Agent, or Firm*—Antonelli, Terry, Stout & Kraus, LLP

(57) ABSTRACT

To provide a waveguide-arrayed optical wavelength multiplexer/demultiplexer in which a mode configuration of a waveguide slab output part is matched to a mode configuration of waveguide array input parts, to achieve a reduced loss irrespective of distances between arrayed waveguides, and a manufacturing method of the same, a wavelength multiplexer/demultiplexer (10) is formed on a substrate (11) with a plurality of input waveguides (12) for inputting wavelength division multiplexed optical signals, an output waveguide (13) for combining the wavelength division multiplexed optical signals to be output, a waveguide array (15) as a set of arrayed waveguides (15*b*) having predetermined waveguide length differences (ΔL), an input waveguide slab (14) for interconnecting the plurality of input waveguides (12) and the waveguide array (15), and an output waveguide slab (17) for interconnecting the waveguide array (15) and the output waveguide (13), and the input waveguide slab (14) and the output waveguide slab (17) are configured to have their intended refractivity distributions (16, 19).

4 Claims, 5 Drawing Sheets

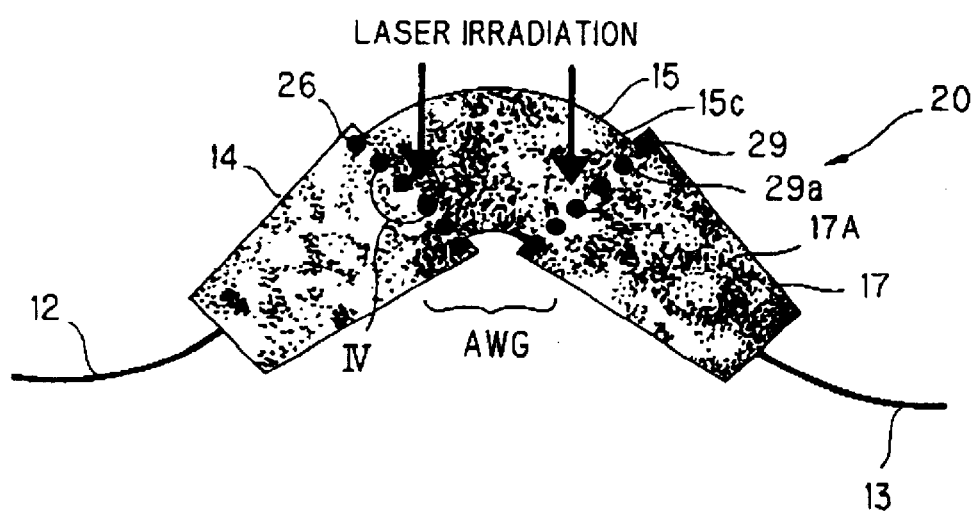
FIG. 4A
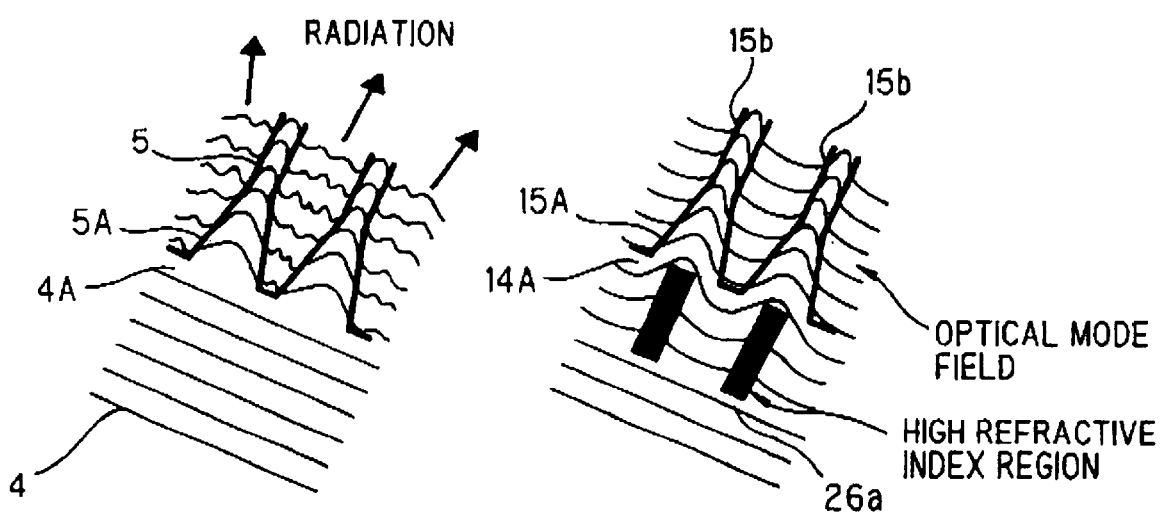
FIG. 4C
PRIOR ART
FIG. 4B

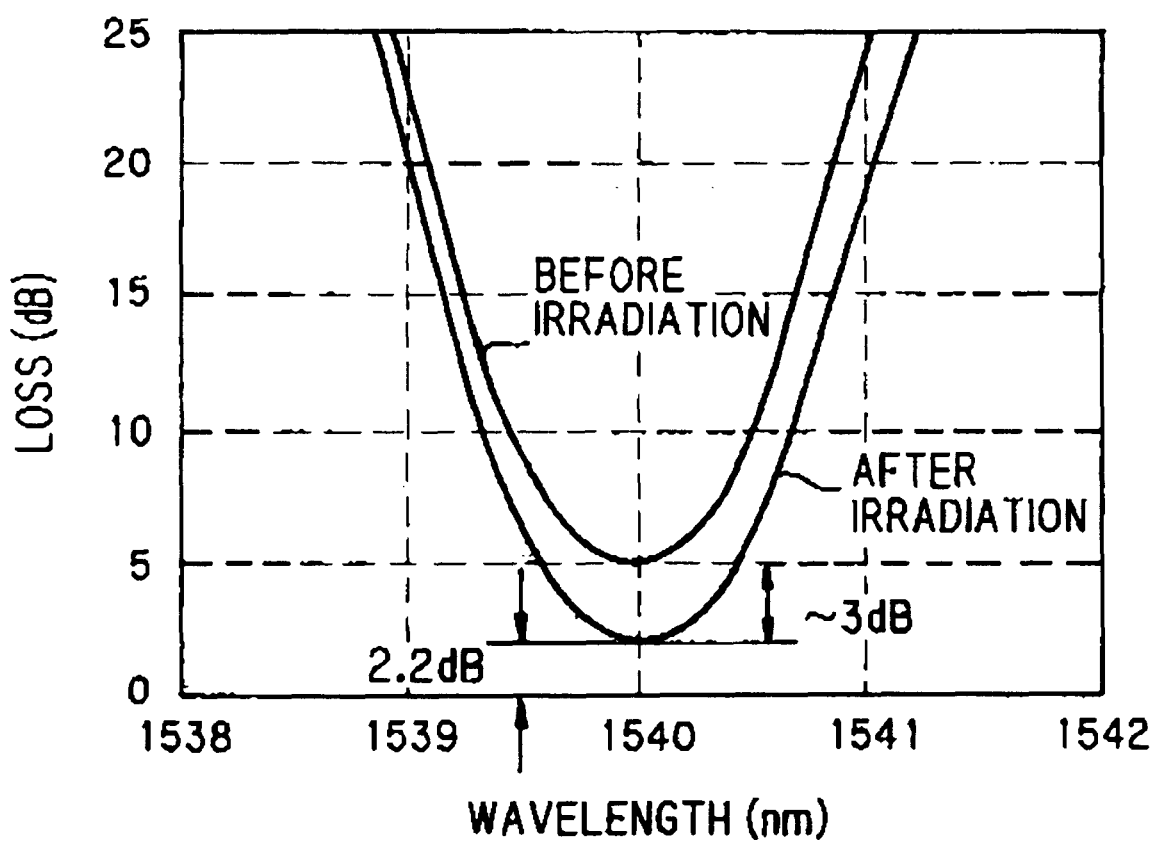

WAVEGUIDE-ARRAYED OPTICAL WAVELENGTH MULTIPLEXER/DEMULTIPLEXER AND FABRICATION METHOD OF THE SAME

BACKGROUND OF THE INVENTION

1. Field of the Invention

The present invention relates to a wavelength multiplexer/demultiplexer for spatial combination of or split into selected wavelengths, and in particular, to a waveguide-arrayed optical wavelength multiplexer/demultiplexer, and to a manufacturing method of the same.

2. Prior Art

FIG. 1A and FIG. 1B show a conventional waveguide-arrayed optical wavelength multiplexer/demultiplexer using an AWG (arrayed waveguide grating), which has, on a substrate 1 thereof: a plurality of input waveguides 2 for inputting wavelength division multiplexed optical signals; an output waveguide 3 for combining the wagelength division multiplexed optical signals to be output; a waveguide array 5 constituted with a plurality of arrayed waveguides 5b having predetermined waveguide length differences ΔL; an input waveguide slab 4 for interconnecting the plurality of input waveguides 2 and the waveguide array 5, and an output waveguide slab 7 for interconnecting the waveguide array 5 and the output waveguide 3.

In this conventional waveguide-arrayed optical wavelength multiplexer/demultiplexer, incident light from the input waveguides 2 enters the input waveguide slab 4, where it radiates, to be coupled to the waveguide array 5. However, the mode of optical transmission is different in configuration between an output part 4A of the waveguide slab 4 and input parts 5A of the waveguide array 5, such that all the incident light is not coupled, thus resulting in a coupling loss.

FIG. 2A and FIG. 2B show another conventional waveguide-arrayed optical wavelength multiplexer/demultiplexer, in which a waveguide array 5 has narrowed distances L between arrayed waveguides 5b, whereby the mode of optical transmission between a waveguide slab output part 4A and waveguide array input parts 5A is devised to be matching in configuration, thereby implementing a reduction of loss in the wavelength multiplexer/demultiplexer using an AWG.

However, this conventional waveguide-arrayed optical wavelength multiplexer/demultiplexer has at the waveguide slab output part 4A an inter-waveguide distance L1 too narrow for an overclad to be buried thereto without difficulty, as a problem. Failure in burying the overclad would have caused an increased loss.

SUMMARY OF THE INVENTION

The present invention has been made to solve such a problem in the related art. It therefore is an object of the present invention to provide a waveguide-arrayed optical wavelength multiplexer/demultiplexer in which a mode configuration of a waveguide slab output part is matched to a mode configuration of waveguide array input parts, to achieve a reduced loss irrespective of distances between arrayed waveguides, and a manufacturing method of the same.

To achieve the object, according to a first aspect of the invention, there is provided a waveguide-arrayed optical wavelength multiplexer/demultiplexer having, on a base, a plurality of input waveguides for inputting wavelength division multiplexed optical signals, an output waveguide for combining the wagelength division multiplexed optical signals to be output, a waveguide array constituted with a plurality of arrayed waveguides having predetermined waveguide length differences, an input waveguide slab for interconnecting the plurality of input waveguides and the waveguide array, and an output waveguide slab for interconnecting the waveguide array and the output waveguide, wherein one of the input waveguide slab and the output waveguide slab is configured to have an intended refractivity distribution.

According to a second aspect of the invention, in a waveguide-arrayed optical wavelength multiplexer/demultiplexer according to the first aspect, the one of the input waveguide_slab and the output waveguide slab is configured with the intended refractivity distribution partially changed by an ultraviolet laser to have an intended refractivity change.

According to a third aspect of the invention, in a waveguide-arrayed optical wavelength multiplexer/demultiplexer according to the second aspect, the one of the input waveguide slab and the output waveguide slab is configured to have the intended refractivity distribution and the intended refractivity change by irradiating a portion of the one of the input waveguide slab and the output waveguide slab to be high of refractivity with one of an ArF eximer laser and a KrF eximer laser, subject to a masking over a remainder of the portion of the one of the input waveguide slab and the output waveguide slab.

According to a fourth aspect of the invention, in a waveguide-arrayed optical wavelength multiplexer/demultiplexer according to the first aspect, one of the plurality of input waveguides and the output waveguide is configured as a channel waveguide of a single mode with a core formed on the substrate by doping one of Ge, P, and B as a dopant having a photo refractive effect and buried in a clad smaller of refractivity than the core.

According to a fifth aspect of the invention, in a waveguide-arrayed optical wavelength multiplexer/demultiplexer according to the first aspect, one of an outpart of the input waveguide slab and an input part of the output waveguide slab is formed with a set of triangular regions higher of refractivity than a remainder thereof.

According to a sixth aspect of the invention, in a waveguide-arrayed optical wavelength multiplexer/demultiplexer according to the first aspect, one of an outpart of the input waveguide slab and an input part of the output waveguide slab is formed with a set of rectangular regions higher of refractivity than a remainder thereof.

Further, to achieve the object, according to a seventh aspect of the invention, there is provided a manufacturing method of a waveguide-arrayed optical wavelength multiplexer/demultiplexer having, on a base, a plurality of input waveguides for inputting wavelength division multiplexed optical signals, an output waveguide for combining the wagelength division multiplexed optical signals to be output, a waveguide array constituted with a plurality of arrayed waveguides having predetermined waveguide length differences, an input waveguide slab for interconnecting the plurality of input waveguides and the waveguide array, and an output waveguide slab for interconnecting the waveguide array and the output waveguide, wherein one of the input waveguide slab and the output waveguide slab is configured to have an intended refractivity distribution.

According to an eighth aspect of the invention, in a manufacturing method of a waveguide-arrayed optical wavelength multiplexer/demultiplexer according to the seventh aspect, the one of the input waveguide slab and the output waveguide slab is configured with the intended refractivity distribution partially changed by an ultraviolet laser to have an intended refractivity change.

According to a ninth aspect of the invention, in a manufacturing method of a waveguide-arrayed optical wavelength multiplexer/demultiplexer according to the eighth aspect, the one of the input waveguide slab and the output waveguide slab is configured to have the intended refractivity distribution and the intended refractivity change by irradiating a portion of the one of the input waveguide slab and the output waveguide slab to be high of refractivity with one of an ArF eximer laser and a KrF eximer laser, subject to a masking over a remainder of the portion of the one of the input waveguide slab and the output waveguide slab.

According to a tenth aspect of the invention, in a manufacturing method of a waveguide-arrayed optical wavelength multiplexer/demultiplexer according to any of the seventh aspect, one of the plurality of input waveguides and the output waveguide is configured as a channel waveguide of a single mode with a core formed on the substrate by doping one of Ge, P, and B as a dopant having a photo refractive effect and buried in a clad smaller of refractivity than the core.

According to an eleventh aspect of the invention, in a manufacturing method of a waveguide-arrayed optical wavelength multiplexer/demultiplexer according to the seventh aspect, one of an outpart of the input waveguide slab and an input part of the output waveguide slab is formed with a set of triangular regions higher of refractivity than a remainder thereof.

According to a twelfth aspect of the invention, in a manufacturing method of a waveguide-arrayed optical wavelength multiplexer/demultiplexer according to the seventh aspect, one of an outpart of the input waveguide slab and an input part of the output waveguide slab is formed with a set of rectangular regions higher of refractivity than a remainder thereof.

BRIEF DESCRIPTION OF THE ACCOMPANYING DRAWINGS

The above and further objects and novel features of the present invention will more fully appear from the following detailed description when the same is read in conjunction with the accompanying drawings, in which.

Figure 1A:
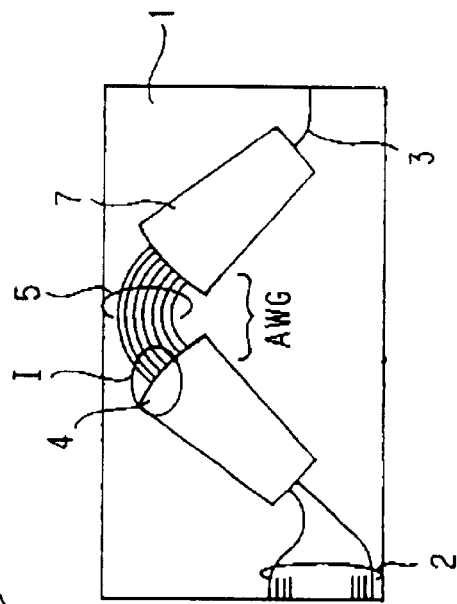
FIG. 1A is a plan of a conventional waveguide-arrayed optical wavelength multiplexer/demultiplexer.
Figure 1B:
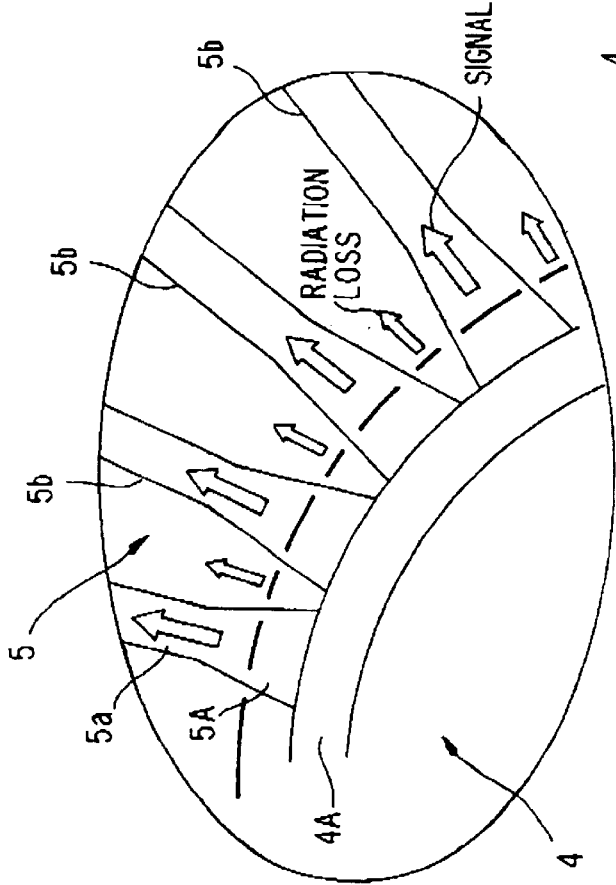
FIG. 1B is a detail of part I of FIG. 1A.

FIG. 4A is a schematic plan of a waveguide-arrayed optical wavelength multiplexer/demultiplexer according to another embodiment of the invention, FIG. 4B is a detail of part IV of FIG. 4A, illustrating an associated optical mode field and rectangular high refractive index regions to be irradiated by laser, and FIG. 4C is a detail of prior art corresponding to FIG. 4B, illustrating a conventional optical mode field; and FIG. 5 is a graph showing an effect of laser irradiation in terms of comparison between FIG. 4B and FIG. 4C.

DETAILED DESCRIPTION OF THE PREFERRED EMBODIMENTS

There will be detailed below the preferred embodiments of the present invention with reference to the accompanying drawings. Like members or elements are designated by like reference characters.

Figure 3A:
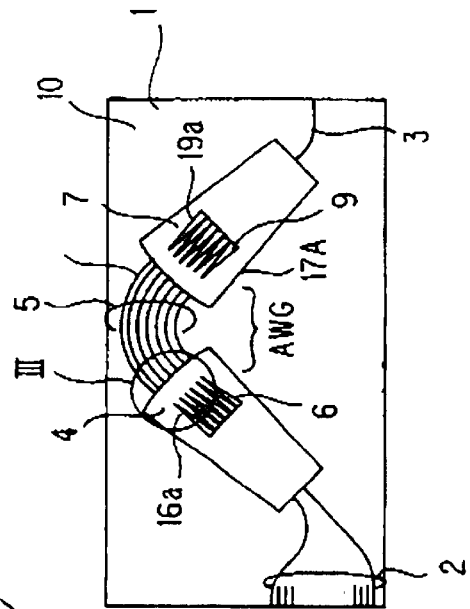
FIG. 3A is a plan of a waveguide-arrayed optical wavelength multiplexer/demultiplexer according to an embodiment of the invention.
Figure 3B:
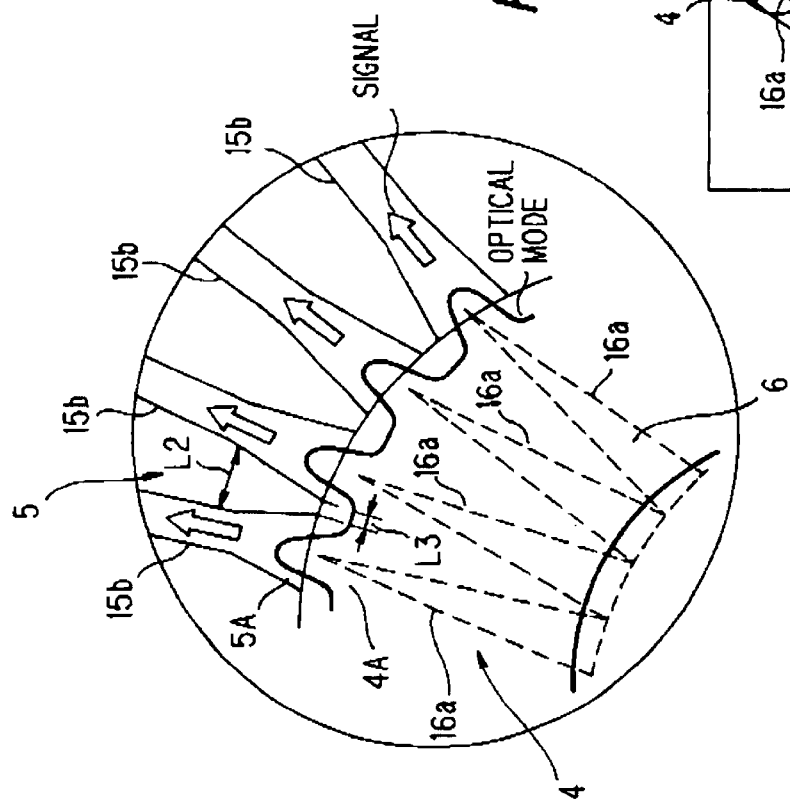
FIG. 3B is a detail of part III of FIG. 3A, illustrating triangular high refractive index regions to be irradiated by laser.

FIG. 3A and FIG. 3B show a waveguide-arrayed optical wavelength multiplexer/demultiplexer 10 including an AWG according to an embodiment of the invention, which is formed on a substrate 11 made of quartz or the like. The multiplexer/demultiplexer 10 is constituted with: a plurality of input waveguides 12 for inputting wavelength division multiplexed optical signals; an output waveguide 13 for combining the wagelength division multiplexed optical signals to be output; a waveguide array 15 as a set of arrayed waveguides 15b having predetermined waveguide length differences ΔL; an input waveguide slab 14 for interconnecting the plurality of input waveguides 12 and the waveguide array 15; and an output waveguide slab 17 for interconnecting the waveguide array 15 and the output waveguide 13.

In this embodiment, as detailed in FIG. 3B, the input waveguide slab 14 has an arcwise extending output part 14A formed with a refractivity changed portion 16 made up as a set of radially arranged substantially triangular refractive index regions 16a higher of refractivity than the remainder, so that the input waveguide slab 14 has an intended refractivity distribution along the output part 14A in opposition to an arcwise extending input part 15A of the waveguide array 15.

The refractivity changed portion 16 is formed, after a masking of the remainder of the input waveguide slab 14, by irradiating this input waveguide slab 14 with an ultraviolet laser, such as an ArF eximer laser or a KrF eximer laser, so that the mode configuration of optical transmission of the refractivity changed portion 6 substantially match that of the waveguide array 15. Irradiation time and power of the ultraviolet laser is controlled to provide the refractivity changed portion 16 with the intended refractivity distribution and an intended refractivity change.

Likewise, as schematically shown in FIG. 3A, the output waveguide slab 17 has an arcwise extending intput part 17A formed with a refractivity changed portion 19 made up as a set of radially arranged substantially triangular refractive index regions 19a higher of refractivity than the remainder, so that the output waveguide slab 17 has an intended refractivity distribution along the input part 17A in opposition to an arcwise extending output part 15C of the waveguide array 15.

The input waveguides 12 as well as the output waveguide 13 is configured as a set of single-mode channel waveguides each respectively constituted with a core formed on the substrate 11 by doping Ge, P, B or the like as a dopant having a photo refractive effect and buried in a clad smaller of refractivity than the core.

Functions of the wavelength multiplexer/demultiplexer 10 will be described below.

In FIG. 3A and FIG. 3B, incident light from the input waveguides 12 enters the input waveguide slab 14, where it radiates to be guided with an expanding Gauss type configuration of optical transmission mode. At the input waveguide slab 14, transmitted light strikes into the refractivity changed portion 16 which is higher of refractive index than the remainder, its phase changes, deforming the mode configuration of the output part 14A of the input waveguide slab 14 in dependence on the above-noted refractivity distribution and refractivity difference. The mode configuration is then matched to a mode configuration of the input part 15A of the waveguide array 15. Beams of light transmitted to the waveguide array 15 strike into the output waveguide slab 17, where they are collected to be output to the output waveguide 13.

In this embodiment, the output part 14A of the input waveguide slab 14 or the input part 17A of the output waveguide slab 17 has a matching mode configuration to the input part 15A or the output part 15C of the waveguide array 15, respectively, whereby the AWG type multiplexer/demultiplexer 10 is allowed to have a reduced radiation loss.

The mode configuration of the input waveguide slab 14 or the output waveguide slab 17 is provided by use of a refractivity change of a core in which a dopant such as Ge, P, B, or the like having a photo refractive effect is doped by irradiation of an ultraviolet laser, and the refractivity distribution in the input waveguide slab 14 or the output waveguide slab 17 is provided by using a mask, upon irradiation of ultraviolet laser, so that the multiplexer/demultiplexer 10 is allowed to be implemented in a simplified structure, with a suppressed production cost increase.

Figure 2A:
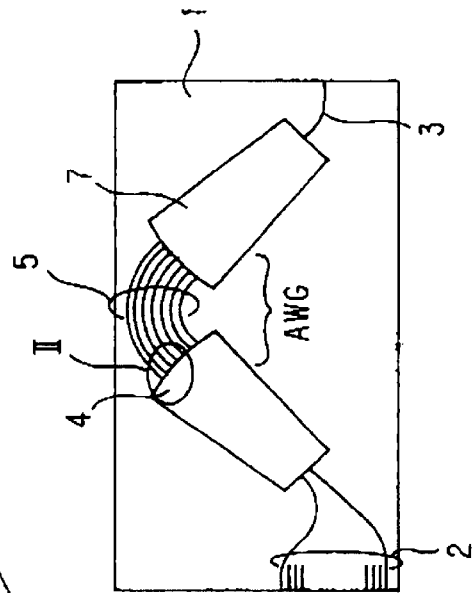
FIG. 2A is a plan of another conventional waveguide-arrayed optical wavelength multiplexer/demultiplexer.
Figure 2B:
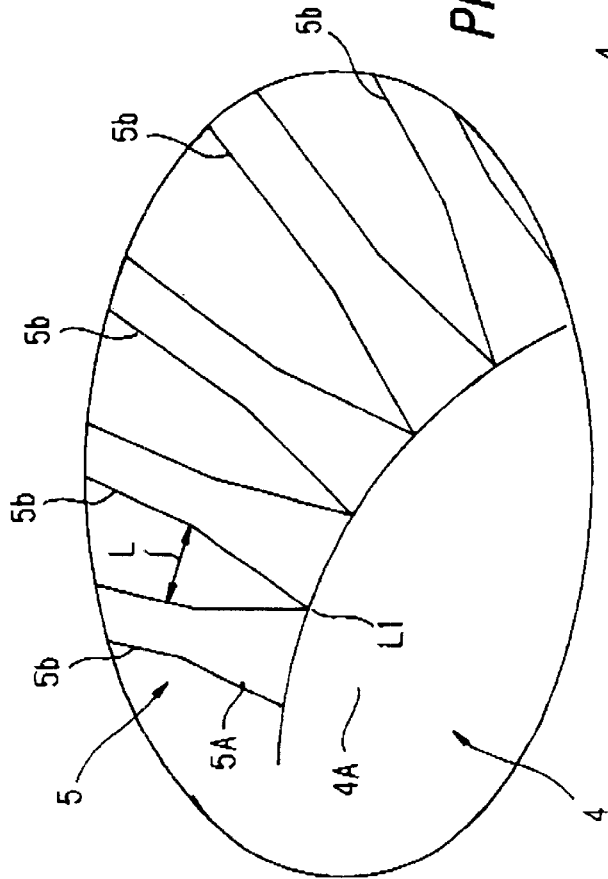
FIG. 2B is a detail of part II of FIG. 2A.

The waveguide array 15 has a relatively wide inter-waveguide distance L2 substantially equivalent to the conventional transmitter/splitter of FIG. 1A. Therefore, the output part 14A of the input waveguide slab 14 as well as the input part 17A of the output waveguide slab 17 is kept from becoming too narrow, resulting in a facilitated burying of the overclad in comparison with the conventional transmitter/splitter of FIG. 2A.

FIG. 4A and FIG. 4B show a waveguide-arrayed optical wavelength multiplexer/demultiplexer 20 including an AWG according to another embodiment of the invention, which also is formed on a substrate made of quartz or the like. The multiplexer/demultiplexer 20 is constituted with: a plurality of input waveguides 12 for inputting wavelength division multiplexed optical signals; an output waveguide 13 for combining the wagelength division multiplexed optical signals to be output; a waveguide array 15 as a set of arrayed waveguides 15b having predetermined waveguide length differences ΔL; an input waveguide slab 14 for interconnecting the plurality of input waveguides 12 and the waveguide array 15; and an output waveguide slab 17 for interconnecting the waveguide array 15 and the output waveguide 13. The input waveguide slab 14 has an arcwise extending output part 14A formed with a refractivity changed portion 26 made up as a set of radially arranged substantially rectangular refractive index regions 26a higher of refractivity than the remainder, so that the input waveguide slab 14 has an intended refractivity distribution along the output part 14A in opposition to an arcwise extending input part 15A of the waveguide array 15. Likewise, the output waveguide slab 17 has an arcwise extending intput part 17A formed with a refractivity changed portion 29 made up as a set of radially arranged substantially rectangular refractive index regions 29a higher of refractivity than the remainder, so that the output waveguide slab 17 has an intended refractivity distribution along the input part 17A in opposition to an arcwise extending output part 15C of the waveguide array 15.

The wavelength multiplexer/demultiplexer 20 of this embodiment has like effects to the previous embodiment.

As will be apparent by comprison between FIG. 4B, which illusrates an optical mode filed of the waveklength multiplexer/demultiplexer 20, and FIG. 4c, which illustrates a radiating optical mode field of the conventional wavelength multiplexer/demultiplexer of FIG. 1A, the present embodiment has an effectively reduced radiation loss implemented by provision of the high refractive indecx regions 26a and 29a formed by laser irradiation.

FIG. 5 shows an effect of the irradiation in a graph of spectral response (with fibers and connectors inclusive), which plots a radiation loss versus wavelength characteristic curve after irradiation in comparison with a radiation loss versus wavelength characteristic curve before irradiation, indicating a reduction of radiation lose up to 3 dB, allowing for the radiation to be reduced to 2.2 dB. It is noted the wavelength multiplexer/demultiplexer of the previous embodiment which has triangular high refractive index regions 16a and 19a is allowed to be more effective in reduction of radiation loss than the present embodiment which has rectangualr high refractive index regions 26a and 29a.

As will be seen from the foregoing embodiments, according to the present invention, a mode configuration of a waveguide slab output part can match with a mode configuration of a waveguide array, a wavelength multiplexer/demultiplexer is allowed to have a reduced coupling loss irrespective of an inter-waveguide spacing.

What is claimed is:

1. A waveguide-arrayed optical wavelength multiplexer/demultiplexer comprising, on a base:
   a plurality of input waveguides for inputting wavelength division multiplexed optical signals;
   an output waveguide for combining the wagelength division multiplexed optical signals to be output;
   a waveguide array constituted with a plurality of arrayed waveguides having predetermined waveguide length differences;
   an input waveguide slab for interconnecting the plurality of input waveguides and the waveguide array; and
   an output waveguide slab for interconnecting the waveguide array and the output waveguide;
   wherein one of the input waveguide slab and the output waveguide slab is configured to have a refractivity distribution;
   wherein said one of the input waveguide slab and the output waveguide slab is configured with the refractivity distribution partially changed by an ultraviolet laser to have an intended refractivity change.

2. A waveguide-arrayed optical wavelength multiplexer/demultiplexer comprising, on a base:
   a plurality of input waveguides for inputting wavelength division multiplexed optical signals;
   an output waveguide for combining the wagelength division multiplexed optical signals to be output;
   a waveguide array constituted with a plurality of arrayed waveguides having predetermined waveguide length differences;
   an input waveguide slab for interconnecting the plurality of input waveguides and the waveguide array; and
   an output waveguide slab for interconnecting the waveguide array and the output waveguide;
   wherein one of the input waveguide slab and the output waveguide slab is configured to have a refractivity distribution;
   wherein said one of the input waveguide slab and the output waveguide slab is configured with the refractivity distribution partially changed by an ultraviolet laser to have an intended refractivity change;

wherein said one of the input waveguide slab and the output waveguide slab is configured to have the refractivity distribution and the intended refractivity change by irradiating a portion of said one of the input waveguide slab and the output waveguide slab to be high of refractivity with one of an ArE eximer laser and a KrF eximer laser, subject to a masking over a remainder of the portion of said one of the input waveguide slab and the output waveguide slab.

3. A manufacturing method of a waveguide-arrayed optical wavelength multiplexer/demultiplexer comprising, on a base:

a plurality of input waveguides for inputting wavelength division multiplexed optical signals;

an output waveguide for combining the wagelength division multiplexed optical signals to be output;

a waveguide array constituted with a plurality of arrayed waveguides having predetermined waveguide length differences;

an input waveguide slab for interconnecting the plurality of input waveguides and the waveguide array; and an output waveguide slab for interconnecting the waveguide array and the output waveguide;

wherein one of the input waveguide slab and the output waveguide slab is configured to have refractivity distribution;

wherein said one of the input waveguide slab and the output waveguide slab is configured with the refractivity distribution partially changed by an ultraviolet laser to have an intended refractivity change.

4. A manufacturing method of a waveguide-arrayed optical wavelength multiplexer/demultiplexer comprising, on a base:

a plurality of input waveguides for inputting wavelength division multiplexed optical signals;

an output waveguide for combining the wavelength division multiplexed optical signals to be output;

a waveguide array constituted with a plurality of arrayed waveguides having predetermined waveguide length differences;

an input waveguide slab for interconnecting the plurality of input waveguides and the waveguide array;

an output waveguide slab for interconnecting the waveguide array and the output waveguide;

wherein one of the input waveguide slab and the output waveguide slab is configured to have refractivity distribution; and wherein said one of the input waveguide slab and the output waveguide slab is configured with the refractivity distribution partially changed by an ultraviolet laser to have an intended refractivity change;

wherein said one of the input waveguide slab and the output waveguide slab is configured to have the refractivity distribution and the intended refractivity change by irradiating a portion of said one of the input waveguide slab and the output waveguide slab to be high of refractivity with one of an ArF eximer laser and a KrF eximer laser, subject to a masking over a remainder of the portion of said one of the input waveguide slab and the output waveguide slab.

* * * * *